United States Patent [19]

Huber

[11] Patent Number: 4,634,524
[45] Date of Patent: Jan. 6, 1987

[54] DEVICE FOR REMOVING SCREENED OR SIFTED MATERIAL FROM LIQUID FLOWING IN A GUTTER

[75] Inventor: Hans G. Huber, Berching, Fed. Rep. of Germany

[73] Assignee: Hans Huber GmbH, Berching, Fed. Rep. of Germany

[21] Appl. No.: 735,342

[22] Filed: May 17, 1985

[30] Foreign Application Priority Data

May 30, 1984 [DE] Fed. Rep. of Germany ....... 3420157

[51] Int. Cl.$^4$ .............................................. B01D 33/00
[52] U.S. Cl. .................................... 210/158; 210/394
[58] Field of Search ............... 210/393, 394, 396, 397, 210/403, 416.1, 405, 523, 525, 158, 161, 780, 781, 784, 413–415; 209/270

[56] References Cited

U.S. PATENT DOCUMENTS

| | | | |
|---|---|---|---|
| 1,594,999 | 8/1926 | Carter | 210/393 |
| 2,149,877 | 3/1939 | Wuensch | 209/270 |
| 2,228,185 | 1/1941 | Thompson | 210/403 |
| 3,616,932 | 11/1971 | Bancroft | 210/405 |
| 4,054,507 | 10/1977 | Pouska | 210/784 |
| 4,306,975 | 12/1981 | Siewert et al. | 210/394 |

FOREIGN PATENT DOCUMENTS 2142540  3/1973  Fed. Rep. of Germany .
3019127 11/1981  Fed. Rep. of Germany .

*Primary Examiner*—Bernard Nozick
*Attorney, Agent, or Firm*—Max Fogiel

[57] ABSTRACT

A device for removing screened or sifted material from liquid flowing in a gutter (1) has a sloping cylindrical grizzly (11) that is mounted in the gutter, that is partly immersed in the liquid, and that has a face that is open upstream and closed downstream. The device also has a conveyor (5) that is positioned coaxial to the grizzly, that leads to an ejection point (18) outside of the liquid, and that has a powered shaft (7) and a housing (6). The conveyor has an intake funnel (9) for the screened or sifted material in the vicinity of the grizzly. The device also has a separator (15) for the screened or sifted material positioned above the intake funnel. The grizzly (11) is rotated. The separator (15) is positioned stationary on the outside of the grizzly (11) and releases screened or sifted material that adheres to the inside of the grizzly.

7 Claims, 1 Drawing Figure

U.S. Patent   Jan. 6, 1987   4,634,524
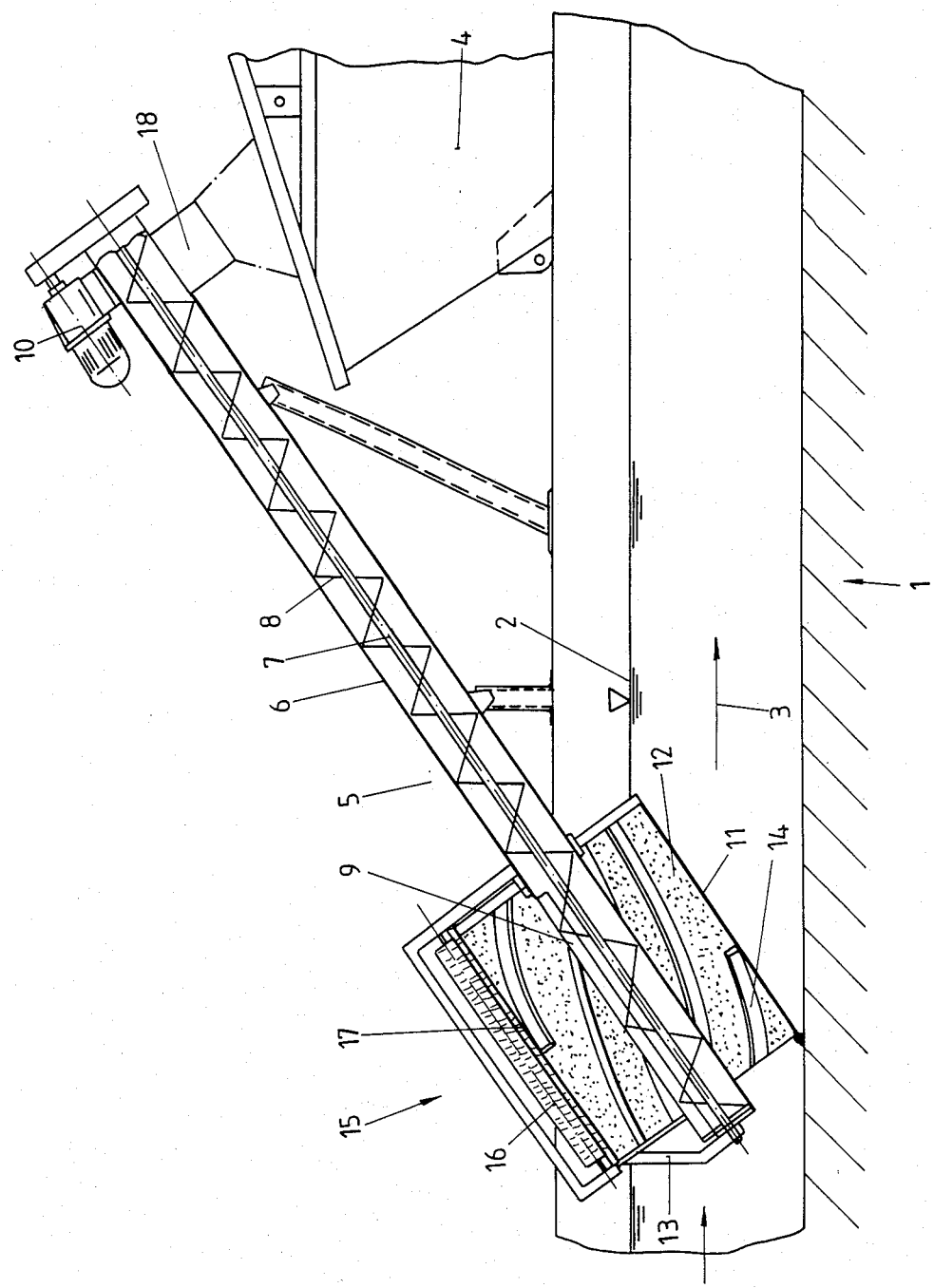

DEVICE FOR REMOVING SCREENED OR SIFTED MATERIAL FROM LIQUID FLOWING IN A GUTTER

The invention concerns a device for removing screened or sifted material from liquid flowing in a gutter.

The device is especially appropriate for use in sewage-treatment plants but can also be employed in the textile industry, in slaughter houses, poultry farms, tanneries, etc.

A device of this type is known from German Pat. No. 3 019 127. A screw conveyor is positioned along the axis of the cylindrical surface of a grizzly and consists of a housing and of a screw. The diameter of the housing is considerably shorter than that of the grizzly. Since both diameters are extensively independent of each other, the device can be adapted to gutters of different width without modifying the conveyor. The grizzly is stationary and has perforations over about ¼ of the top of its circumference. The bottom end of the conveyor shaft has at least one clearing arm provided with clearing structures and extending along the grizzly. The grizzly can consist of a number of equidistant annular disks. This known device is very appropriate for removing comparatively coarse screened or sifted material because its design prevents the free cross-section of the grizzly from being as small as might be desired. Since the clearing structures sweep the stationary grizzly, specifically even below the water line of the gutter, the material must also be separated from the grizzly and picked up by the clearing structures even below the water line. This relative motion entails the risk that particularly fine material will not get picked up by the clearing arm or will become detached from the clearing structures again as they sweep the grizzly below the water line.

German Offenlegungsschrift No. 2 142 540 discloses a similar device that consists essentially of a screw conveyor with a shaft driven by a mounted motor and rotating in a housing. The conveyor housing is replaced with a grizzly at the bottom in the vicinity of the given water level. In operation, the helix of the conveyor directly sweeps along the grizzly and conveys the screened or sifted material either up into the conveyor or through the screen, depending on its particle size. The conveyor housing is shaped essentially like a cylinder or trough and has an ejection point for material. The grizzly is stationary in this case as well. Since the diameter of the grizzly equals that of the housing, the surface of the grizzly is relatively small and it must be cleaned more often. This device can be employed only for specific purposes.

The object of the present invention is to improve a device of the type initially described to the extent that the precipitation of finer screened or sifted material will be essentially increased.

Since only one component, specifically the grizzly itself, accordingly comes into contact with the screened or sifted material below the water line, the material will both accumulate on the grizzly and be conveyed up by it as it rotates. Thus, an additional clearing component to accept or accommodate the material below the water line is unnecessary. It also becomes possible to match the perforated surface of the grizzly precisely to its particular field of application. The grizzly can for example have 3-mm slot perforations. The function of the separator is to remove any material that will not drop off the inside surface of the grizzly as the result of gravity alone. The separator is positioned where the material that leaves it will in any case drop into the intake funnel of the conveyor, where it is picked up, conveyed out of the gutter, and simultaneously drained and compacted. Since the diameter of the grizzly is in this case as well independent of that of the conveyor housing, it can easily be varied to conform to different gutter widths without any need to modify the conveyor. The grizzly must of course be appropriately mounted and sealed off from the gutter to force the liquid in the gutter through the surface of the grizzly.

The rotating grizzly can have fins or other conveyance-promoting structures on its inside surface to improve the upward conveyance of the screened or sifted material as the grizzly rotates. This is especially true for medium-coarse material or when the grizzly is heavily loaded. In this case care must be taken to ensure that the device will still be primarily appropriate for precipitating finer material.

Various embodiments of the separator are possible. The separator can for instance have brushes that operate in conjunction with the grizzly. It can also have nozzles. It is also possible to employ both simultaneously or to employ other types of structure. The choice will depend essentially on the type of material to be precipitated, on its coarseness, and on how tightly it adheres to the inside of the grizzly.

The grizzly is in a practical way connected to the screw conveyor. Both mechanisms share a common drive, with the grizzly being driven by the shaft of the conveyor. This makes it possible to provide only one motor for the overall device. Powering the grizzly separately from the conveyor, however, which is certainly conceivable, would result in the advantage that their individual speeds of rotation could be matched. One or more drive arms that engage the free end of the conveyor and extend to the grizzly can be provided to connect the grizzly directly to the conveyor.

The invention will now be described with reference to a preferred embodiment. The drawing illustrates a schematic section through the device.

A gutter 1 is filled to a water line 2 with liquid that flows direction indicated by arrow 3. The fluid contains screened or sifted material that is to be removed from gutter 1, drained, compacted, and deposited in a container 4.

The device is mounted aslant and extends down to the bottom of gutter 1. It has a screw conveyor 5 that consists essentially of a stationary housing 6 and of a shaft 7 provided with a helix 8. The bottom of housing 6 is provided with an intake funnel 9 and its upper surface is accordingly perforated at that point. A motor 10 and transmission is provided to drive shaft 7.

Surrounding the end of screw conveyor 5 that has intake funnel 9 is positioned or mounted a grizzly 11 with a diameter that is considerably longer than that of housing 6. Grizzly 11 consists essentially of a cylindrical section of sheet metal that is perforated in accordance with the particular type of screened or sifted material to be precipitated. The perforations can be slots 12. Grizzly 11 is also rotated and must accordingly be appropriately mounted in and sealed off from gutter 1. Drive arms 13 that engage the free end of shaft 7 transmit power from the shaft and from motor 10. The face of grizzly 11 must of course be open in the vicinity of drive arms 13, whereas it will be essentially closed above water line 2. The inside surface of grizzly 11 can have fins 14 to promote the upward conveyance of screened or sifted material precipitating there. Such fins are especially practical when there is a lot of material or when it is not only fine but also coarse.

At the uppermost rotating section of the cylindrical surface of grizzly 11 is a separator 15, which can be provided with wear-resistant brushes 16, roller brushes for example, or water nozzles 17 or both. The function of separator 15 is to loosen any screened or sifted material that does not drop off of the inner surface of grizzly 11 as the result of gravity alone and to prevent the grizzly from clogging up.

Whereas the liquid itself passes through grizzly 11, the screened or sifted material always accumulates on the part of the inner surface of the grizzly that lies below water line 2. Since grizzly 11 rotates, the accumulated material is conveyed upward as the result of its adhesion to the inside of the grizzly and emerges above water line 2. This conveyance is promoted by fins 14. At the top, the material drops, partly as the result of gravity and partly due to the action of separator 15, directly into the intake funnel 9 on screw conveyor 5. Although intake funnel 9 is indeed also partly positioned below water line 2, the screened or sifted material accumulates to an even greater extent at this point, and is accordingly conveyed upward. This results in the material being drained and compacted. The compacted material is finally conveyed out of the housing 6 of screw conveyor 5 at ejection point 18 and drops into a container 4, in which it can be taken away.

I claim:

1. A device for removing screened or sifted material from liquid flowing in a gutter, comprising: a sloping cylindrical grizzly mounted in the gutter and being partly immersed in the liquid, said grizzly having a face open upstream and closed downstream; a conveyor with a housing positioned coaxial to said grizzly, said conveyor leading to an ejection point outside of the liquid; said conveyor having a powered shaft with a helix; said conveyor housing having an intake funnel for screened or sifted material in vicinity of said grizzly; a separator for the screened or sifted material positioned above said intake funnel; said grizzly being rotated; said separator being positioned stationary on the outside of sid grizzly to release screened or sifted material adhering to the inside of said grizzly.

2. A device as defined in claim 1, including fins on the inside surface of said rotating grizzly.

3. A device as defined in claim 1, wherein said separator has a brush operating in conjunction with said grizzly.

4. A device as defined in claim 1, wherein said separator has nozzles for spraying water.

5. A device as defined in claim 1, wherein said separator has a brush operating in conjunction with said grizzly, said separator having also nozzles for spraying water.

6. A device as defined in claim 1, wherein said conveyor comprises a screw conveyor, said grizzly being rigidly connected to said screw conveyor; and common drive means for driving said grizzly and said screw conveyor.

7. A device as defined in claim 6, including at least one drive arm connecting said grizzly to said powered shaft with said helix.

* * * * *